United States Patent [19]
Awaji

[11] Patent Number: 5,506,615
[45] Date of Patent: Apr. 9, 1996

[54] VIDEO-ON-DEMAND SYSTEM AND METHOD WITH HIGH SPEED REPEATING TRANSMISSION OF VIDEO DATA, AND VIDEO CASSETTE RECORDING CAPABILITY

[75] Inventor: Toshio Awaji, Kawasaki, Japan

[73] Assignee: Fujitsu Limited, Kanagawa, Japan

[21] Appl. No.: 210,336

[22] Filed: Mar. 18, 1994

[30] Foreign Application Priority Data

Sep. 20, 1993 [JP] Japan .................. 5-233424

[51] Int. Cl.⁶ .................................. H04N 7/173
[52] U.S. Cl. .................. 348/7; 348/13; 455/4.2
[58] Field of Search .................. 348/6, 7, 10, 12, 348/13; 455/4.1, 4.2, 5.1, 6.1; H04N 7/16, 7/173

[56] References Cited

U.S. PATENT DOCUMENTS

| | | | |
|---|---|---|---|
| 4,251,691 | 2/1981 | Kakihara et al. | 348/14 |
| 4,506,387 | 3/1985 | Walter | 348/13 |
| 4,538,176 | 8/1985 | Nakajima et al. | 348/7 |
| 4,829,372 | 5/1989 | McCalley et al. | 348/12 |
| 5,133,079 | 7/1992 | Ballantyne et al. | 455/4.1 |
| 5,172,413 | 12/1992 | Bradley et al. | 348/7 |
| 5,247,347 | 9/1993 | Litteral et al. | 455/4.2 |
| 5,262,875 | 11/1993 | Mincer et al. | 348/6 |
| 5,339,315 | 8/1994 | Maeda et al. | 348/7 |
| 5,341,474 | 8/1994 | Gelman et al. | 348/7 |

FOREIGN PATENT DOCUMENTS

| | | |
|---|---|---|
| 5014861 | 1/1993 | Japan . |
| 535407 | 2/1993 | Japan .................. G06F 3/06 |

Primary Examiner—James J. Groody
Assistant Examiner—Chris Grant

[57] ABSTRACT

A video information distribution system allows users to call a video center and receive required video information from the video center through high- and low-speed transmission lines. The system employs trunk units. The trunk units are arranged in the video center or between the video center and the users, to receive video information repeatedly transmitted at high speed through the high-speed transmission lines. The trunk units reproduce the received video information at normal speed and transmit the reproduced information to the users through the low-speed transmission lines. Each of the trunk units has a reproduction memory, a fast-forward memory, and a rewind memory to provide the users with reproduction, fast-forward, and rewind functions similar to a video deck.

13 Claims, 19 Drawing Sheets

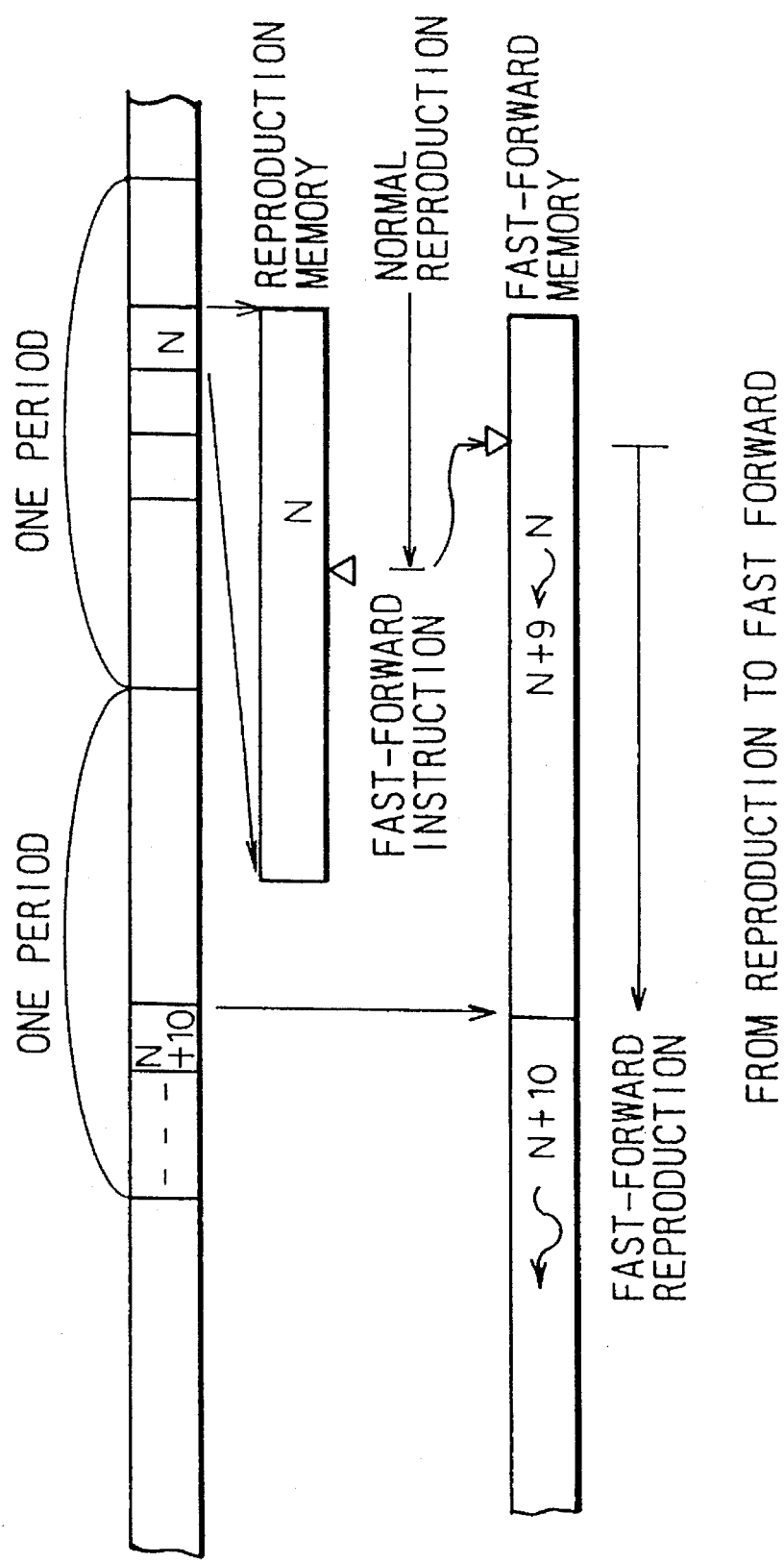

VIDEO-ON-DEMAND SYSTEM AND METHOD WITH HIGH SPEED REPEATING TRANSMISSION OF VIDEO DATA, AND VIDEO CASSETTE RECORDING CAPABILITY

BACKGROUND OF THE INVENTION

1. Field of the Invention

The present invention relates to a video information distribution system, and particularly, to a video dial tone service involving a video center, an exchange, and a communications network, for transmitting video information to homes and offices.

Conventional information services such as broadcasting and CATV provide users with programs at fixed hours. On the other hand, the video dial tone service allows individual users to (1) watch programs whenever they want to and (2) stop watching the programs and resume them later on. To realize this service, a video on-demand method is employed. The method allows each user to interactively specify a program kept in a video center and carry out start position specifying, fast-forwarding, and rewinding operations on the program.

2. Description of the Related Art

A conventional video dial tone service involves a video center storing a plurality of video sources. The video center provides user's video terminals with video information, i.e., video programs through a CATV network or a telephone exchange network. Users send network control signals to access the video center and watch video information such as movies at any time.

The video dial tone service may be achieved according to the on-demand method or a near on-demand method. The on-demand method allows a user to monopolize a program. Accordingly, the user can freely fast-forward and rewind the program. This method, however, has a disadvantage that a busy rate increases if many users simultaneously request the same program because the video center keeps a limited number of source programs. To solve this problem, the video center must keep many copies of the same program.

The near on-demand method compensates for the disadvantage of the on-demand method. This method sends a program to a plurality of channels with different start points so that a plurality of users may share the same program. When a user requests the program, a channel having the nearest start point at the time is allocated for the user. This method, however, has several disadvantages. Waiting time to the nearest start point becomes longer if the number of the channels is small. When a user carries out a fast-forward or rewind operation, the channels must be switched from one to another. At this time, video images widely jump from one to another if the number of the channels is insufficient. Namely, this method is incapable of carrying out precise control, and in particular, is unable to provide repeat and slow functions.

SUMMARY OF THE INVENTION

An object of the present invention is to provide a video information distribution system that provides users with the same operability and functions as those provided by video decks. The present invention improves the operability of the conventional near on-demand method close to that of the video deck, without increasing the number of video sources to be kept in a video center.

In order to accomplish the object, a video distribution system according to the present invention repeatedly transfers video information at high speed through transmission lines. Users call a video center and receive necessary video information such as video programs from the video center through the transmission lines.

The system arranges trunk units in the video center or between the video center and the users, to receive the video information repeatedly transferred at high speed and reproduce normal-speed video information from the high-speed video information. The trunk units are connected to the transmission lines through a switch, to connect a user who requests a video program to one of the transmission lines that transfers the requested program. Each trunk unit is connected to a user through a control channel and a main information channel for transmitting video information.

Each of the trunk units has at least one reproduction memory. The trunk unit detects a start position in the high-speed video information, selects a portion starting from the start position of the video information corresponding to the capacity of the reproduction memory, and stores the portion in the memory. The trunk unit converts the stored information into normal-speed video information, which is sent to the user. The capacity of the reproduction memory is set to be equal to or larger than a period of the repetition of the high-speed transfer of video information, to continuously receive the high-speed video information and reproduce the same without a gap.

Each of the trunk units may have two reproduction memories for storing two consecutive portions of the high-speed video information. The two reproduction memories are alternately used, so that the just reproduced information in at least one of the reproduction memories may be reviewed by a user, if the user sends a repeat request. If the user sends a slow reproduction request, the trunk unit reproduces the video information in the reproduction memories at a slower speed than the normal speed.

Each of the trunk units has a fast-forward memory. When storing video information from the transmission line into the reproduction memories, the trunk unit also stores the video information into the fast-forward memory at a sampling speed determined according to a ratio between the normal and fast-forward reproduction speeds. When a user sends a fast-forward request, the trunk unit reproduces the video information in the fast-forward memory.

Each of the trunk units has a rewind memory to store a past portion before the present reproduction point of the high speed video information. If a user issues a rewind request, the trunk unit reproduces the video information in the rewind memory.

The trunk unit stores the video information in the rewind memory in the forward direction of memory addresses and reproduces the same for the user in the reverse direction from the bottom of the memory addresses. The trunk unit may have two rewind memories to store two consecutive portions of the video information. The trunk unit reproduces the video information pieces in the rewind memories one after another.

The video center keeps video information such as video programs in video files. The video files are connected to high-speed highways each transmitting the video information in a highway data format. The highway data format is composed of frames. Each of the frames has a program header indicating the name and length of a program. The program header also includes data indicating the position of the frame in the program. The program header is followed by program data including 22 time slots of video data, a time slot of translated voice data, and a time slot of original voice data. One of the translated and original voice data is selected and reproduced with video data and sent to an output highway.

BRIEF DESCRIPTION OF THE DRAWINGS

The present invention will be more clearly understood from the description as set forth below with reference to the accompanying drawings wherein:

FIG. 16(C) explains an operation (2) of the fast-forward function of FIG. 16(A);

DESCRIPTION OF THE PREFERRED EMBODIMENTS

Figure 1:
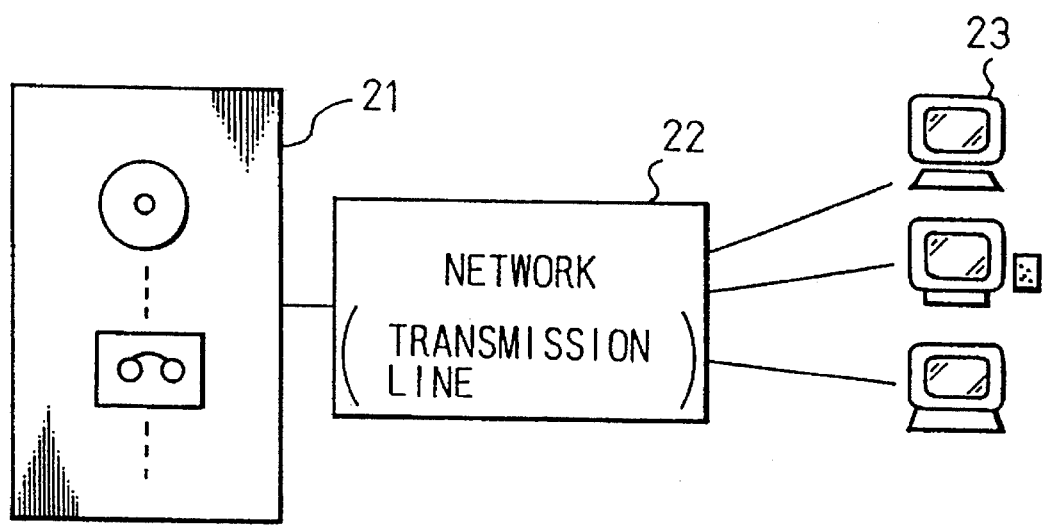
FIG. 1 is a model showing a video dial tone service network.
Figure 2:
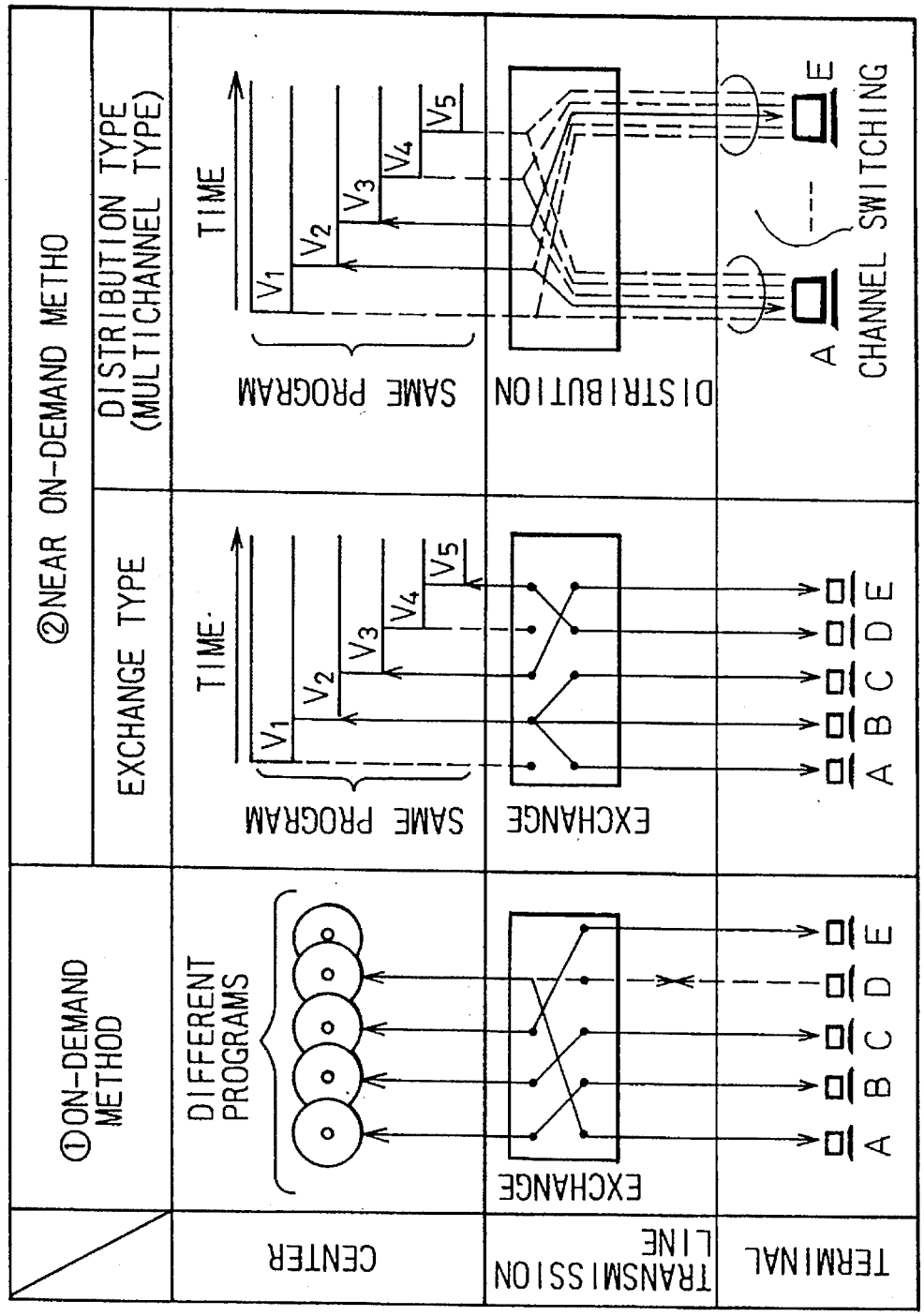
FIG. 2 explains different methods for realizing the video dial tone service.

Before describing the preferred embodiments according to the present invention, examples of the related art are provided with reference to accompanying FIGS. 1 and 2.

In FIG. 1, a video center 21 has a plurality of video sources. Video information from the video center 21 is transmitted through a network 22 such as a CATV network and a telephone exchange network and is distributed to video terminals 23 of individual users. Whenever a user wants to see a video program such as a movie, the user sends network control signals to access the video center 21 to receive the movie.

FIG. 2 shows different methods to realize the video dial tone service (Nikkei Communication, 1993, Feb. 15, No. 144, pp. 38 to 42). The on-demand method allows a user to monopolize a program, so that the user may freely fast-forward and rewind the program. This method, however, has a disadvantage that a busy rate increases if many users simultaneously request the same program because the number of source programs kept in the video center is limited. To solve this problem, the video center must have many copies of the same program.

The near on-demand method compensates for the disadvantage of the on-demand method. This method sends a program to a plurality of channels with different start points so that a plurality of users may share the same program. When a user requests the program, a channel having the nearest start point at the time is allocated for the user. This method, however, has several disadvantages. Waiting time to the nearest start point becomes longer if the number of the channels is small. If a user sends a fast-forward or rewind request, the channels must be switched from one to another. At this time, video images widely jump from one to another if the number of the channels is insufficient. Namely, this method is incapable of carrying out precise control, and in particular, unable to provide repeat and slow functions.

Figure 3:
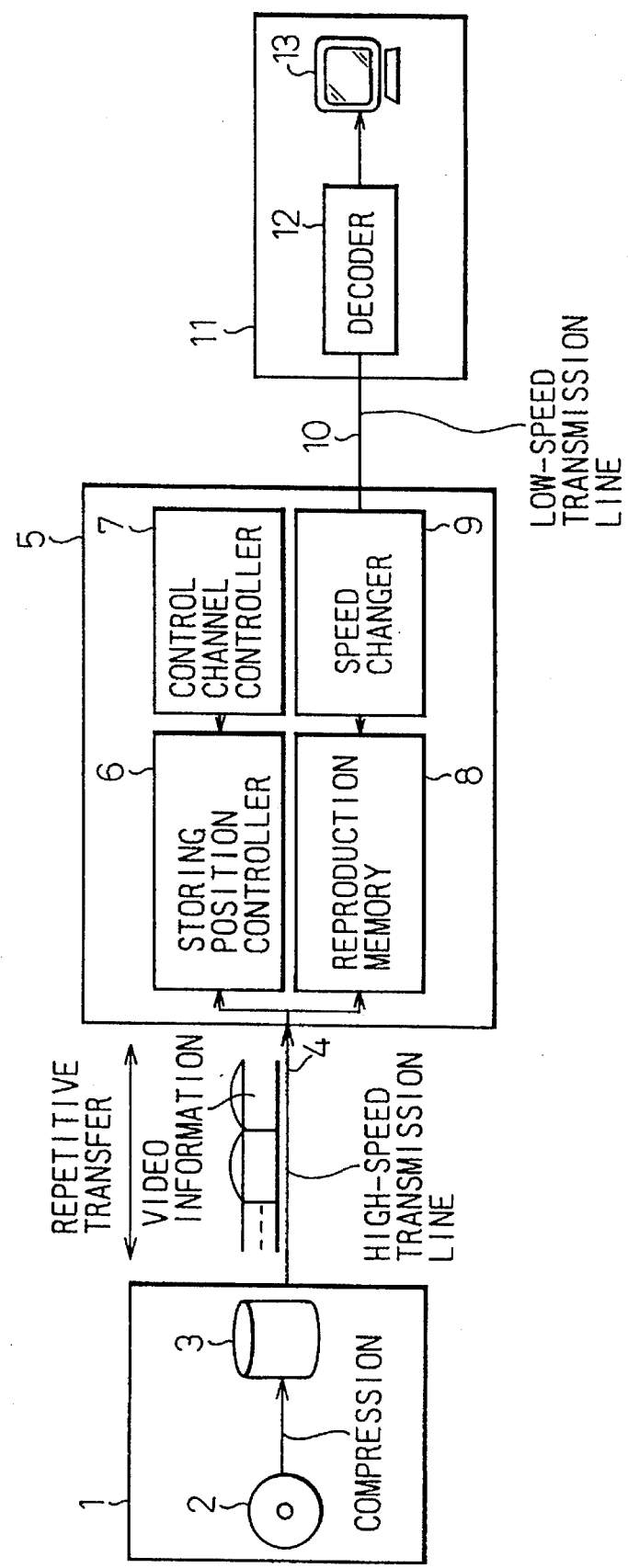
FIG. 3 shows a basic arrangement of a video information distribution system according to the present invention.
Figure 4:
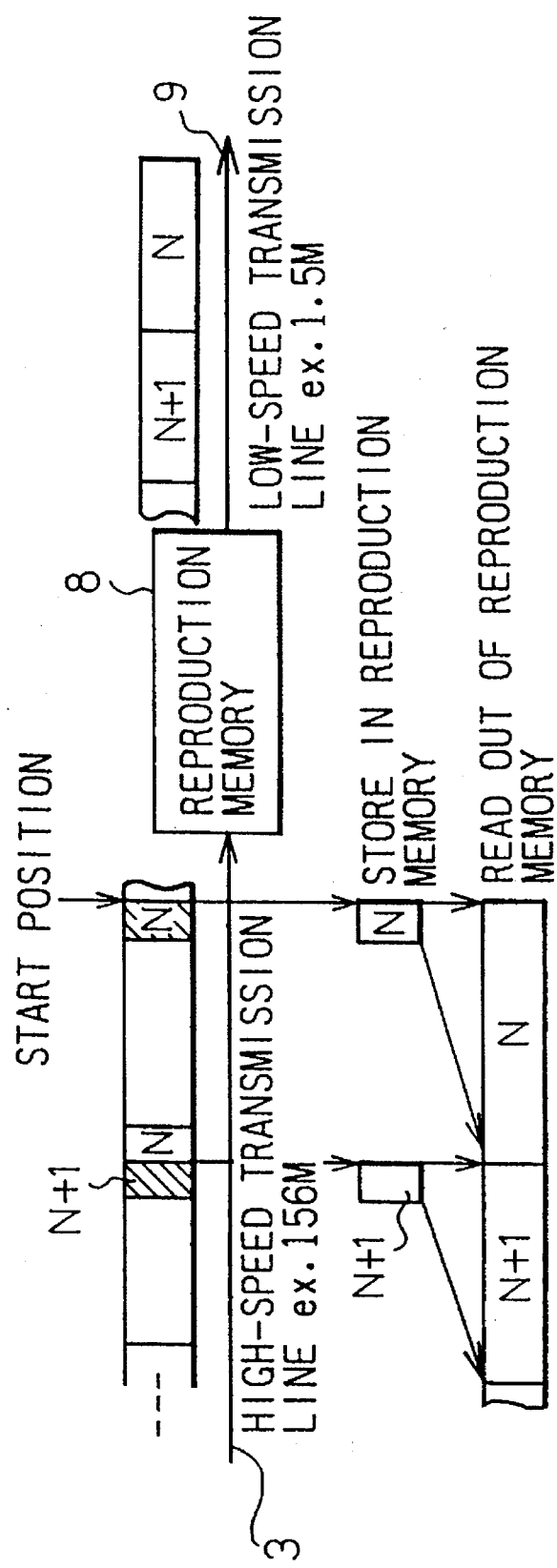
FIG. 4 shows a basic data format transmitted through the system of FIG. 3.

FIG. 3 shows a basic arrangement of a video information distribution system according to the present invention, and FIG. 4 shows a video information transmission format.

According to the system of FIG. 3, a user 11 calls a video center 1 and requests video information such as a video program. The video center 1 sends the requested information to the user 11 through high- and low-speed transmission lines 4 and 10. At this time, the information is repeatedly sent at high speed through the high-speed transmission line 4 as shown in FIG. 4.

The system employs a video dial tone trunk unit 5. The trunk unit 5 is arranged in the video center 1 or between the video center 1 and the user 11, to receive the video information repeatedly transferred and reproduce the video information at a normal speed. The trunk unit 5 is connected to the transmission line 4 through a switch. When the user 11 requests video information, the trunk unit 5 is allocated for the user 11. The user 11 is connected to the trunk unit 5 through a control channel and a main channel for transmitting video information.

The trunk unit 5 has at least one reproduction memory 8, a position detector 6 for detecting a start position in the high-speed video information, and a control channel controller 7 for storing a portion of the video information from the start position into the memory 8. The trunk unit 5 also has a speed changer 9 for changing the high speed of the video information into a normal speed at which the video information is reproduced and transmitted to the user 11. The capacity of the memory 8 is equal to or larger than a period of repetition of the high-speed video information, to receive a portion of the video information consecutive to a portion thereof that is presently reproduced.

The trunk unit 5 may have two reproduction memories 8 to store two consecutive portions of the high-speed video information with one of them being presently reproduced. The memories 8 are alternately used. When the user 11 issues a repeat request, at least one preceding portion of the video information stored in one of the memories 8 can be again sent to the user 11. If the user 11 issues a slow reproduction request, the trunk unit 5 reproduces the video information stored in the memories 8 at a slower speed than the normal speed.

The trunk unit 5 may have a fast-forward memory. When storing video information from the transmission line 4 into the reproduction memories 8, the trunk unit 5 also stores the video information into the fast-forward memory at a sampling speed determined according to a ratio between the normal and fast-forward reproduction speeds. When the user 11 issues a fast-forward request, the trunk unit 5 reproduces the video information in the fast-forward memory.

The trunk unit 5 may have a rewind memory to store a past portion before the present reproduction point of the information repeatedly transmitted at high speed through the transmission line 4. If the user 11 issues a rewind request, the trunk unit 5 reproduces the video information stored in the rewind memory. The trunk unit 5 stores the video information in the rewind memory in the forward direction of memory addresses and reproduces the same for the user 11 in the reverse direction from the bottom of the memory addresses. The trunk unit 5 may have two rewind memories to store two consecutive portions of the video information. The trunk unit 5 reproduces the video information pieces in the rewind memories one after another.

The video center 1 keeps video information such as video programs in video files 3. The video files 3 are connected to highways (HWs) each transmitting the video information in a highway data format. The highway data format is composed of frames. Each of the frames has a program header indicating the name and length of a program. The program header also includes data indicating the position of the frame in the program. The program header is followed by program data including 22 time slots of video data, a time slot of translated voice data, and a time slot of original voice data. One of the translated and original voice data is selected and reproduced with video data and sent to an output highway.

As shown in FIG. 4, the video information is repeatedly transmitted through the high-speed transmission line 4. Video information such as a movie of 100 minutes is transmitted in several minutes. The present technology compresses video information at about 1.5 Mb/s. Accordingly, 100-minute video information may be transmitted in one minute through a 156-Mb/s high-speed transmission line.

The reproduction memory 8 in the trunk unit 5 has a capacity of one minute real time reproduction. Accordingly, the memory 8 stores a one-minute portion (N) from a start position of the video information repeatedly transmitted through the high-speed transmission line 4 at intervals of one minute. The video information stored in the memory 8 is reproduced and transmitted in about one minute through the low-speed transmission line 10 to a video terminal 13 of the user 11.

Video information (N+1) consecutive to the video information (N) is stored as the next one-minute real time video information in the reproduction memory 8. These operations are repeated until the 100-minute video information is completely sent to the user 11. These video information storage and reproduction processes according to the present invention realize the reproduction, fast-forward, and rewind functions.

The capacity of the reproduction memory 8 is about 1.5 Mb/s×60 s=90 Mb (megabits), which is smaller than 16 MB (megabytes). This capacity is easily achievable by the present memory technology. The reproduction memory 8 stores a 0.6-second portion of the high-speed information transmitted through the high-speed transmission line 4 and reproduces the same in about one minute, precisely 1.01 minutes in real time. Since the next video information arrives 1.01 minutes after the presently reproduced information, one-minute video information is reproduced in extended 1.01 minutes.

Figure 5:
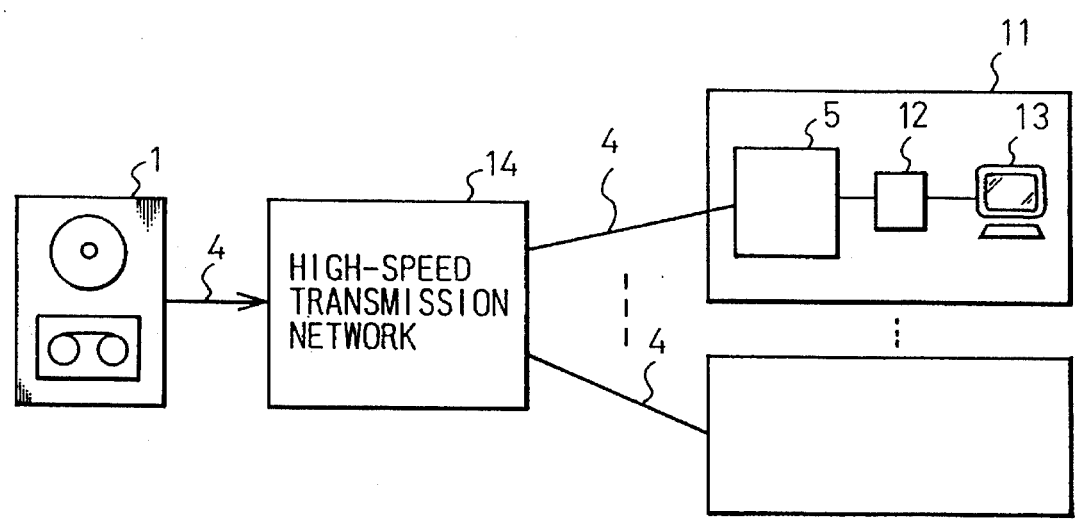
FIG. 5 is a model showing a video dial tone service network according to an embodiment of the present invention.

FIG. 5 shows an example of a video dial tone service network according to the present invention. The same parts as those of FIG. 3 are represented with like reference numerals and their explanations will not be repeated. In this example, a high-speed transmission line 4 is extended up to individual users 11. Accordingly, reproduction memories are arranged on the users 11 side. This arrangement may increase the cost of user apparatus and complicate the same.

Figure 6:
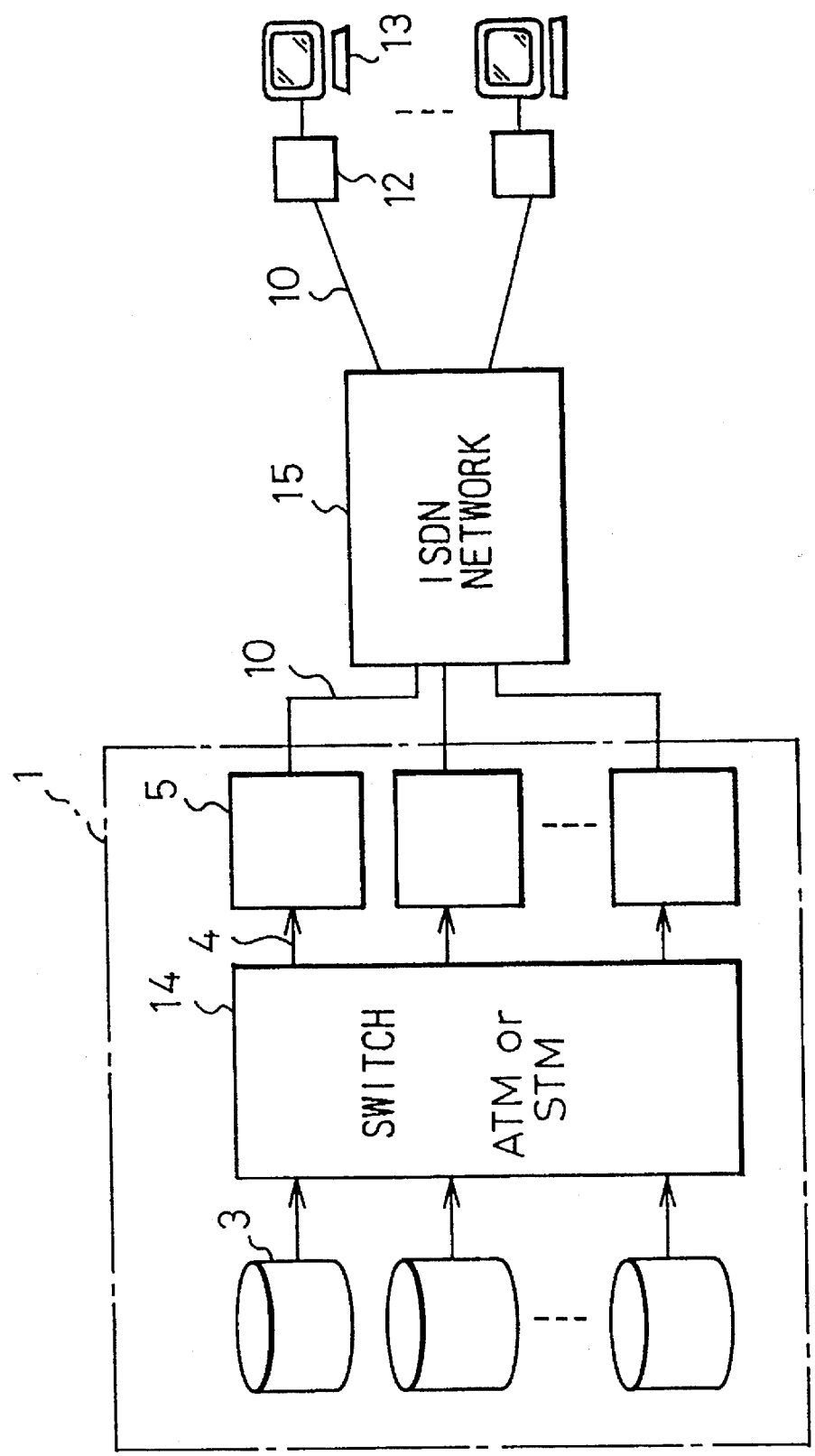
FIG. 6 is a model showing a video dial tone service network according to another embodiment of the present invention.

FIG. 6 shows another example of a video dial tone service network according to the present invention. This example arranges reproduction memories in a video center 1. The reproduction memories serve as video dial tone trunk units 5, which are allocated to users when requested. The network of FIG. 6 is a practical solution according to the present invention. The video center 1 is connected to the users through low-speed transmission lines 10 of 1.5 Mb/s. The trunk units 5 are freely connected to video programs through an STM (Synchronous Transfer Mode) or ATM (Asynchronous Transfer Mode) switch 14. The number of the trunk units 5 is equal to the maximum number of simultaneous users.

Figure 7:
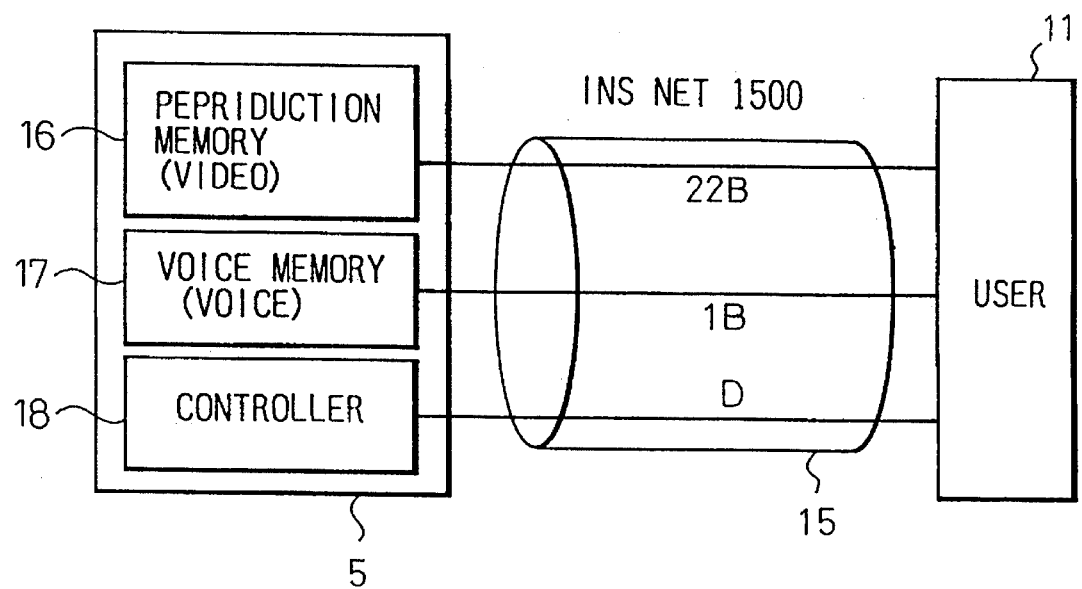
FIG. 7 shows a trunk-to-user interface of the network of FIG. 6.

FIG. 7 shows an example of a trunk-to-user interface of the network of FIG. 6. The trunk unit 5 in the video center 1 is connected to the user 11 through an ISDN primary group service 15 having a transfer speed of 1.544 Mb/s. The primary group service involves twenty-three 64-Kb/s B data channels and one 64-Kb/s D control channel. Among the 23 B channels, 22 are used to transmit video information and one is used to transmit voice information. The D channel is used to specify, fast-forward, and rewind a program.

An embodiment of the video dial tone trunk unit according to the present invention will be explained with reference to FIG. 8. The trunk unit is arranged in a video center.

The video center stores video files 101$_1$ to 101$m$ each containing compressed video and voice information. The video and voice information of the video files 101$_1$ to 101$m$ is periodically read at high speed as shown in FIG. 4.

The video and voice information from the video files 101$_1$ to 101$m$ is optionally supplied to video dial tone trunk units 103$_1$ to 103$n$ through an STM switch 102.

The video center also has a main processing unit 105, an STM switch controller 104, and a multiplexer 106 that connects the trunk units 103$_1$ to 103$n$ to a network in a multiplexing or demultiplexing manner.

Each of the trunk units 103$_1$ to 103$n$ has A and B reproduction memories 121 and 122, A and B rewind memories 123 and 124, and a fast-forward memory 125. The trunk unit also has a selector 115 for selecting the memories according to service conditions such as reproduction and fast forward, a 156-M interface 111 connected to the STM switch 102, a 1.5-M interface connected to the multiplexer 106, a Dch signal processor 116 for transmitting and receiving control data to and from a user, a trunk unit controller 113 for controlling the trunk unit as a whole, and a clock circuit 114 for generating clock signals for these elements.

The clock circuit 114 generates an 8-K frame synchronization clock signal, a 19.44-M clock signal for converting a 156-Mb serial signal into an 8-bit parallel signal, and a 1.5-M clock signal.

Each of the memories 121 to 125 has a time slot position detector 131 for detecting the position of video data in question in a highway data format provided by the 156-M interface 111, a video-voice memory 132, a memory controller 133 for controlling write and read operations of the memory 132, and a shift register 134 for converting a memory output into serial data.

Figure 9:
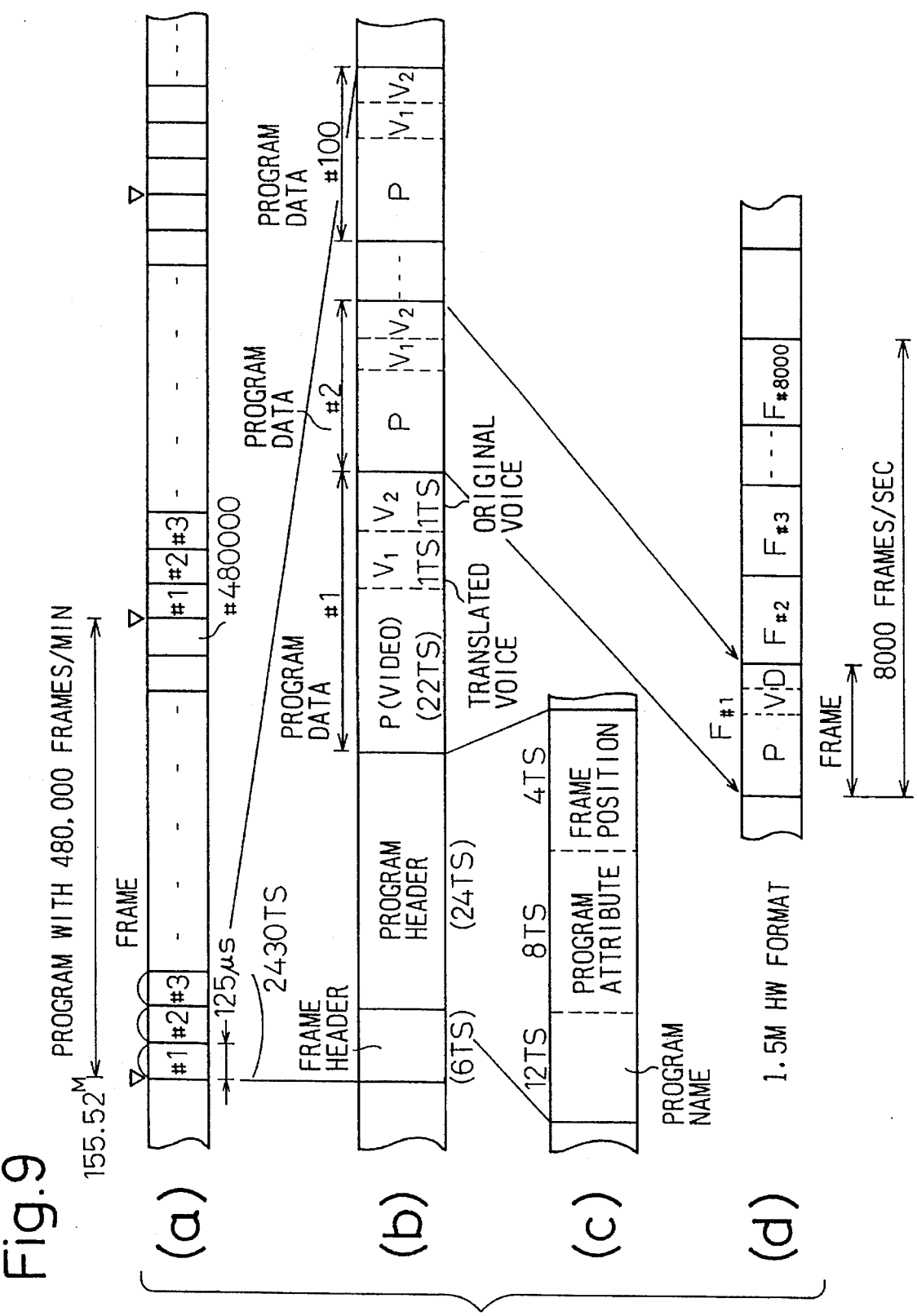
FIGS. 9(a), (b), (c) and (d) show a highway data format handled by the trunk unit of FIG. 8.

FIG. 9 shows the highway data format composed of frames.

FIG. 9(a) shows the frames transmitted from one of the video files through the 156-M highway. Each of the frames spans 125 microseconds and includes 2430 time slots.

FIG. 9(b) shows one of the frames. The frame contains a frame header of six time slots indicating a frame start position, a program header of 24 time slots indicating program information, and 100 (#1 to #100) pieces of program data each composed of 24 time slots.

A video program of 100 minutes is composed of 480,000 frames, which are repeatedly transmitted through the 156-M highway at intervals of one minute. Namely, 48 million pieces of program data are transmitted in one minute. Each piece of the program data includes 22 time slots of video data, one time slot of translated voice data, and one time slot of original voice data.

FIG. 9(c) shows the program header. The program header contains a program name, program attribute such as the length and fee of the program, and the position of the frame in question in the program. The frame position may be one of the numbers #1 to #480000 when the program length is 100 minutes.

FIG. 9(d) shows a 1.5-M highway data format. One frame spans 125 microseconds and includes 24 time slots. The 24 time slots include 22 time slots of video data, one time slot of voice data, and one time slot of Dch data. The voice data is one of the translated and original voice data. The 1.5-M highway transmits 8000 frames, i.e., 8000 pieces of program data per second, and 48 million pieces of program data in 100 minutes.

The trunk unit refers to the frame position data in the 156-M highway data format, stores a 1/100-minute portion of the program in the reproduction memory, reproduces the portion in one minute in real time, and sends the reproduced data to the 1.5-M highway.

Essential elements of the trunk unit according to the present invention will be explained.

Figure 10:
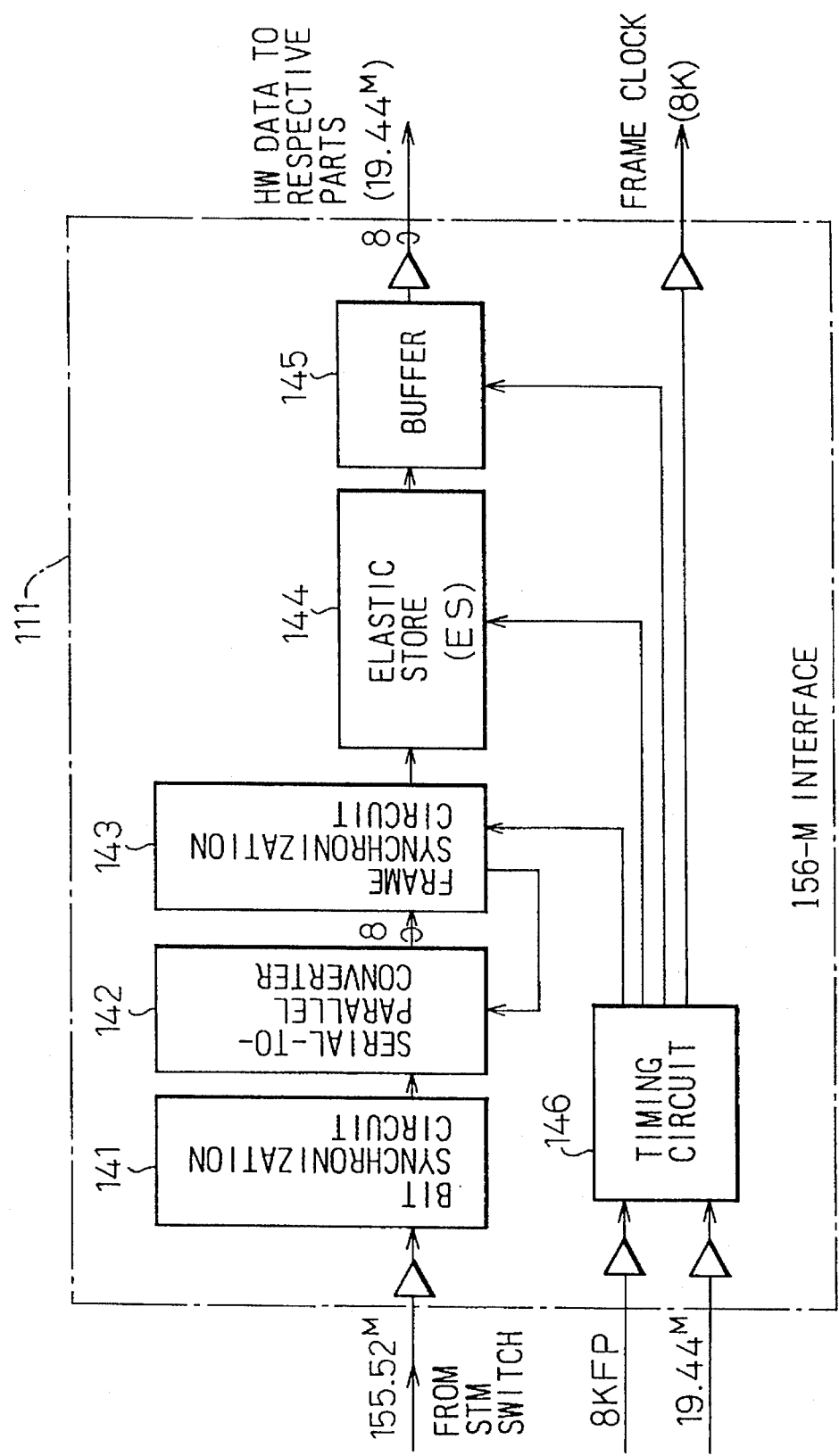
FIG. 10 shows a 156-M highway interface.
Figure 11:
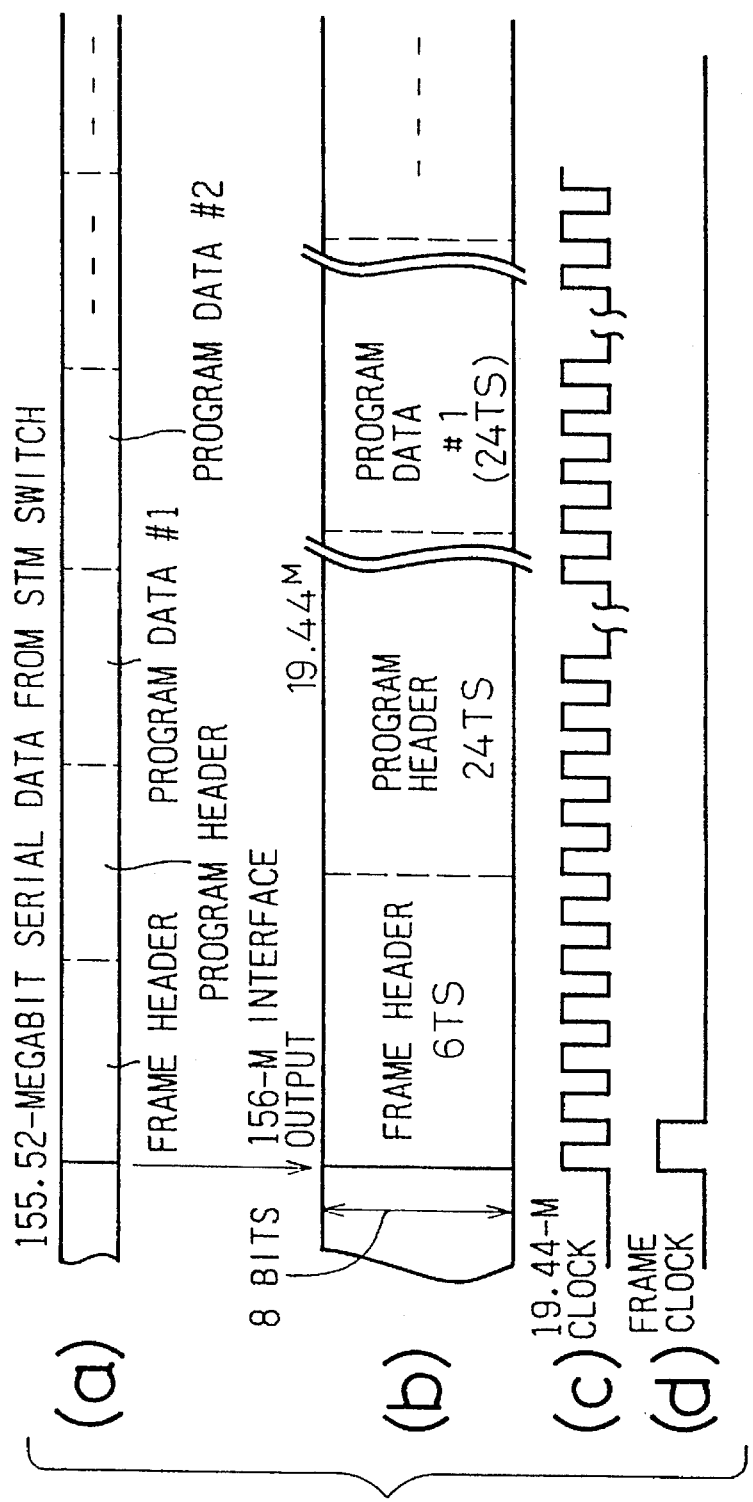
FIGS. 11(a), (b), (c) and (d) show an I/O interface of the 156-M highway interface.

FIG. 10 shows the 156-M interface 111, and FIG. 11 shows an I/O interface data format at the 156-M interface 111.

Figure 8:
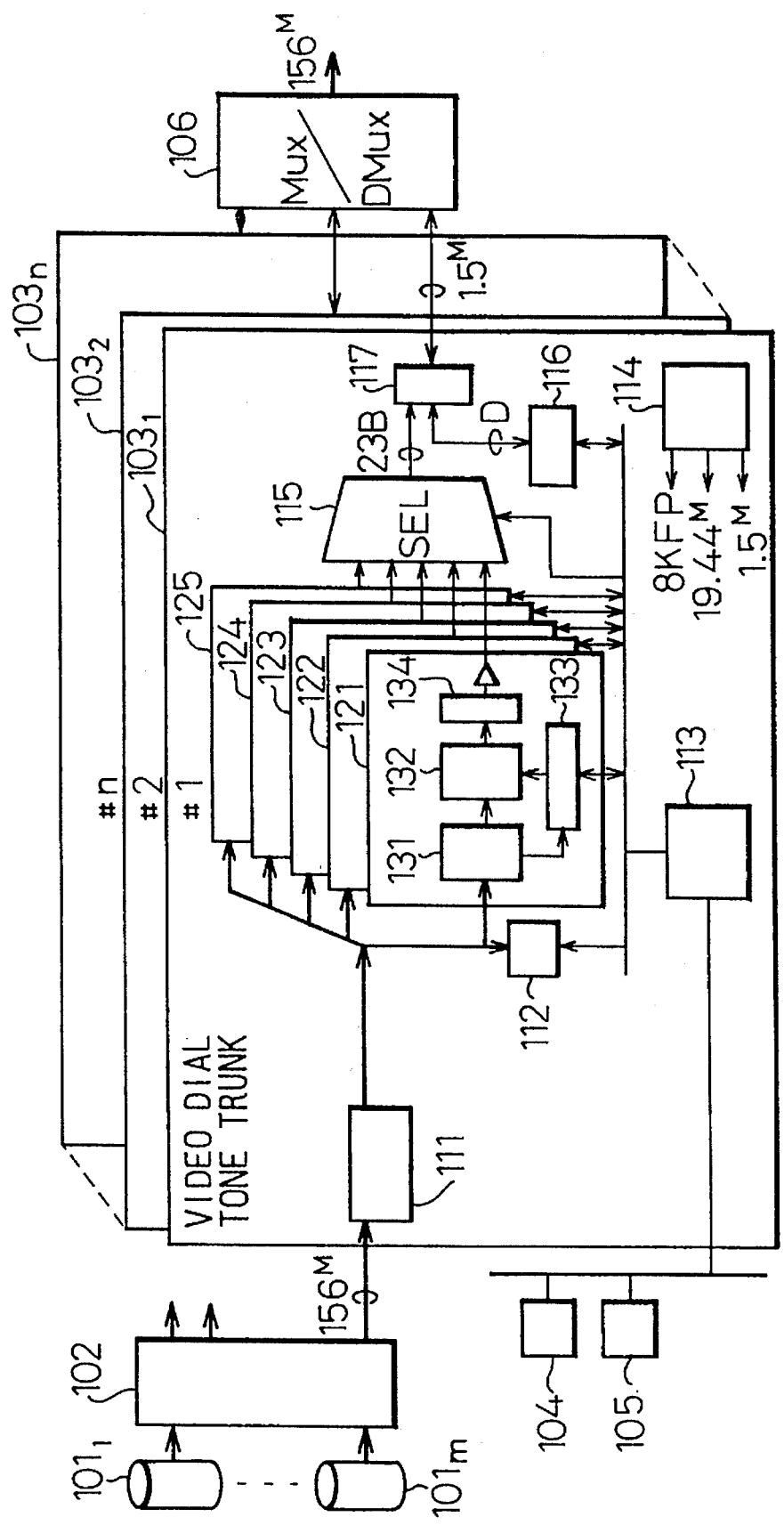
FIG. 8 shows a video dial tone trunk unit according to the present invention.

FIG. 11(a) shows the 156-M highway serial data format from the STM switch 102 (FIG. 8). The serial data are converted into 8-bit parallel data shown in FIG. 11(b) conforming to frame synchronization, through a bit synchronization circuit 141, a serial-to-parallel converter 142, and a frame synchronization circuit 143. The 8-bit parallel data are passed through an elastic memory 144 to provide 19.44-M highway data synchronous to an internal frame of the trunk unit. A timing circuit 146 generates a clock signal for the 156-M interface 111 according to the 8-K frame pulse signal (8 KFP) of FIG. 11(d) and 19.44-M clock signal of FIG. 11(c) provided by the clock circuit 114 of FIG. 8.

Figure 12:
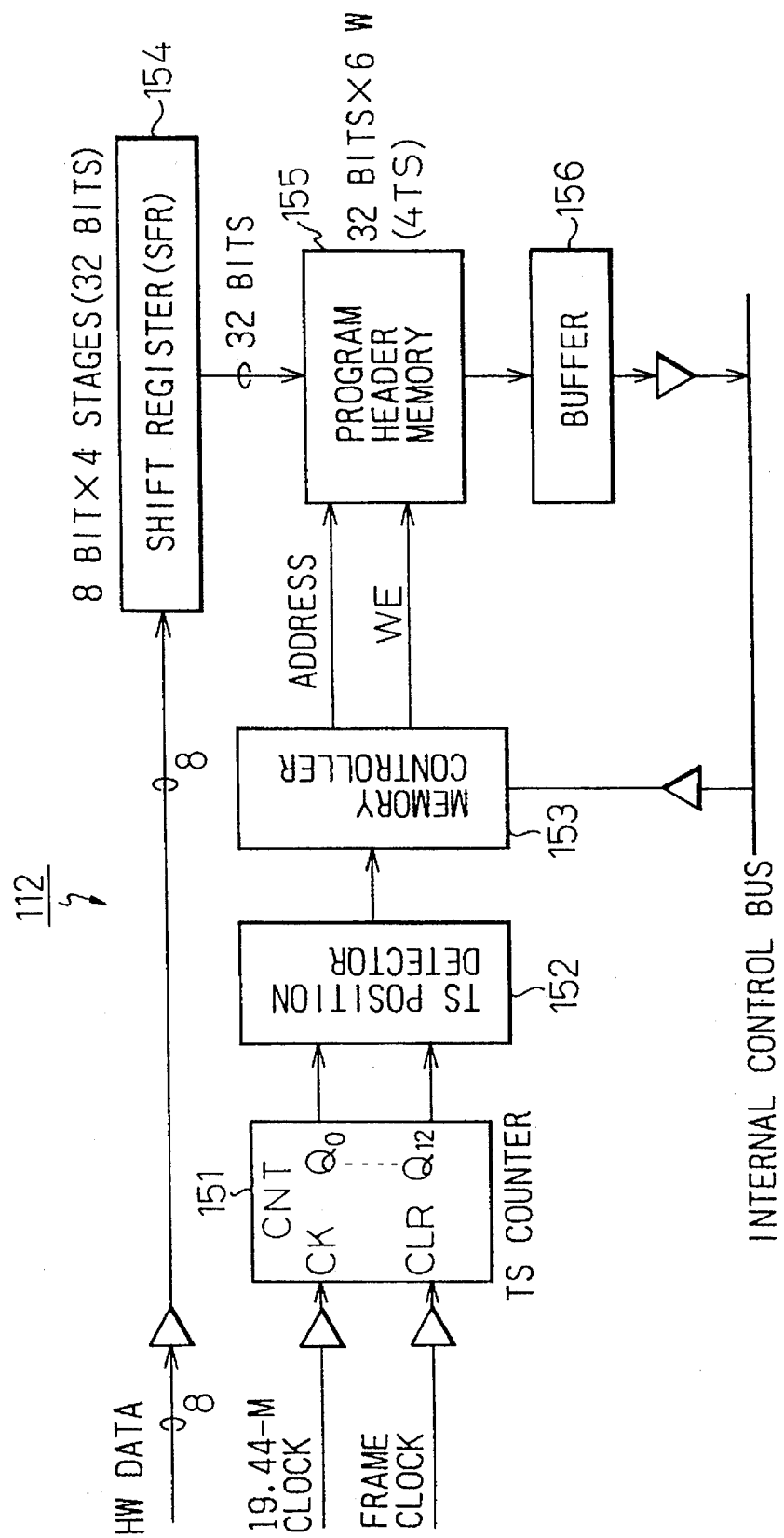
FIG. 12 shows a circuit for extracting a program header.

FIG. 12 shows an example of a program header extraction circuit 112 of FIG. 8.

In the extraction circuit 112, a time slot counter 151 counts the number of time slots in a frame according to the 8-K frame clock signal and 19.44-M clock signal. A detector 152 detects the position of a program header shown in FIGS. 9(b) and 9(c) according to the output of the time slot counter 151. A memory 155 stores the program header. A shift register 154 converts the 8-bit parallel highway data of FIG. 11(b) into 32-bit parallel data. A memory controller 153 controls read and write operations of the program header memory 155. A buffer 156 is used by the trunk unit controller 113 (FIG. 8) to read the program header.

When the time slot position detector 152 detects the position of a program header, every 32 bits corresponding to four time slots are stored in the program header memory 155. At the start of a service, the trunk unit controller 113 confirms that a specified program has been allocated according to the program header and obtains the length and fee of the program according to the program header. While transmitting the program, the trunk unit controller 113 periodically reads the program header memory 155 to always grasp the position of the program in the 156-M highway data format, to realize the rewind, fast-forward, and repeat functions.

Figure 13:
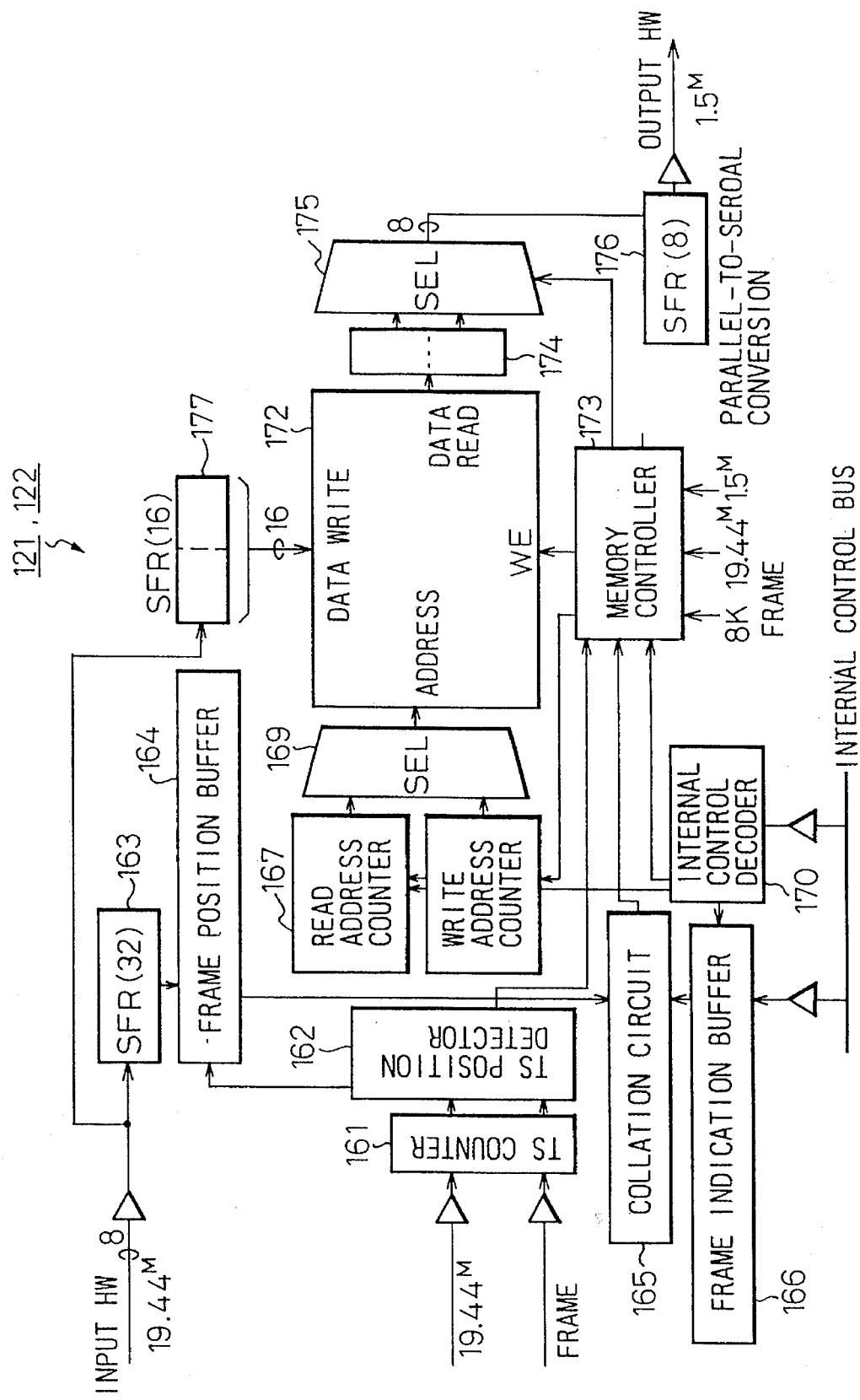
FIG. 13 shows internal circuits of a reproduction memory.

FIG. 13 shows internal circuits in each of the reproduction memories 121 and 122 of FIG. 8. The rewind memories 123 and 124 and fast-forward memory 125 have each the same arrangement.

Similar to the arrangement of FIG. 12, a time slot counter 161, a time slot position detector 162, and a 32-bit shift register 163 extract frame position data in a program header. The frame position data are stored in a frame position buffer 164. At the same time, a start position of program data to be stored is provided by the trunk unit controller 113 and is stored in a frame indication buffer 166. A collation circuit 165 collates the data stored in the buffers 164 and 166 with each other and provides a coincidence signal to a memory controller 173.

The memory controller 173 detects the start of the program data to be stored according to the coincidence signal, clears a write address counter 168, and stores the program data in a video-voice memory 172. A 16-bit shift register 171 converts the 8-bit parallel highway input of FIG. 11(b) from the 156-M interface 111 into 16-bit parallel data, which are stored in the memory 172. The memory 172 has a capacity of 16 MB and a net capacity of 11.52 MB. This simplifies control. Namely, program data of 24 time slots are handled as data of 32 time slots and accessed with a 5-bit address, and program data of 480,000 frames are accessed with a 19-bit address. Converting the 8-bit parallel data into the 16-bit parallel data allows to use relatively low-speed memories and easily select one of the translated and original voice data.

The time slot position detector 162 sends a signal synchronous to the start of 24-time slot program data to the memory controller 173. According to the synchronous signal and a reproduction, rewind, or fast-forward operation, the memory controller 173 updates the read address counter 167 and write address counter 168. Namely, in the normal reproduction operation, the counters 167 and 168 are updated according to the synchronous signal. In the fast-rewind or fast-forward operation, the write counter 168 is thinned so that the program data are sampled and stored in the memory 172. In the slow reproduction operation, the read address counter 167 is thinned so that data read out of the memory 172 is updated once per n times. When updating the read address counter 167, the memory controller 173 indicates a forward direction (+1) or a reverse direction (−1) to achieve forward or reverse reproduction.

The memory controller 173 receives a reproduction instruction from the trunk unit controller 113 through an internal control decoder 170. Then, the memory controller 173 clears the read address counter 167, reads the program data out of the memory 172, and stores the program data in a read buffer 174. The read program data are provided to the 1.5-M highway through a parallel-to-serial conversion 8-bit shift register 176. A selector 175 disposed behind the read buffer 174 not only converts 16-bit data into 8-bit data but also selects one of the translated and original voice data. Namely, when providing one time slot of voice data after 22 time slots of video data, the selector 175 selects one of the translated and original voice data and empties the next one time slot for Dch data. The internal control decoder 170 receives control data from the trunk unit controller 113 through an internal control bus and provides instruction data from the trunk unit controller 113 to the respective elements.

Figure 14:
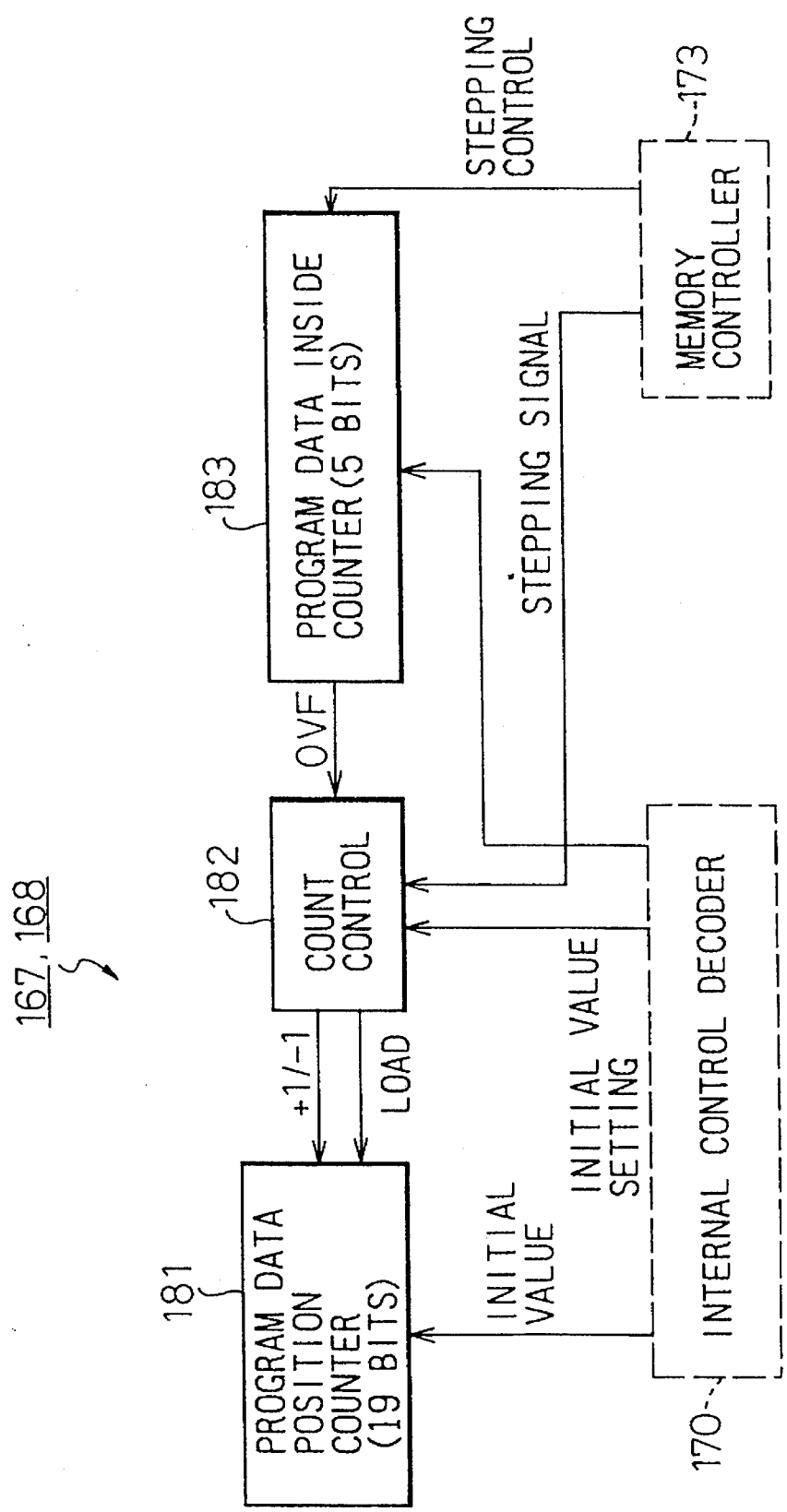
FIG. 14 shows a read (or write) counter.

FIG. 14 shows an arrangement of one of the read counter 167 and write counter 168.

The counter has a 5-bit program data inside counter 183 and a 19-bit program data position counter 181. The lower counter 183 provides an overflow signal (OVF) for every 24 time slots. The overflow signal serves as a count signal for the higher counter 181. In response to the count signal, the higher counter 181 is incremented by one during reproduction and is decremented by one during rewinding. Initial values for the counters are set in response to instructions from the internal control decoder 170. The higher counter 181 is updated according to an instruction from the memory controller 173.

A series of operations started by a user's service request will be explained with reference to FIG. 8.

The user sends a Dch control signal through the network to the video center, and an available one of the video dial tone trunk units 1031 to 103n is allocated for the user. The user sends a Dch control signal to specify video information such as a video program. The trunk unit controller 113 informs the main processing unit 105 of the requested program. The main processing unit 105 controls the STM switch 102 to connect a corresponding one of the video files 1011 to 101m to the trunk unit.

If the user requests to reproduce the program from the beginning, the trunk unit controller 113 stores a start portion of the program in the reproduction memory A (121) and the next consecutive portion thereof in the reproduction memory B (122). At the same time, the trunk unit controller 113 provides necessary instructions to the fast-forward memory 125 and rewind memories 123 and 124. The trunk unit controller 113 instructs the selector 115 to select and transmit the data in the memory 121. The user may issue a fast-forward, rewind, or slow reproduction request with a Dch control signal according to which the fast-forward memory 125 and rewind memories 123 and 124 are controlled.

Various operational functions achieved by the video dial tone trunk unit will be explained with reference to FIGS. 15(A) to 17(C). Blocks shown in FIGS. 15(A), 16(A), and 17(A) have been already explained so they will not be explained again.

(1) Repeat function

Figure 15A:
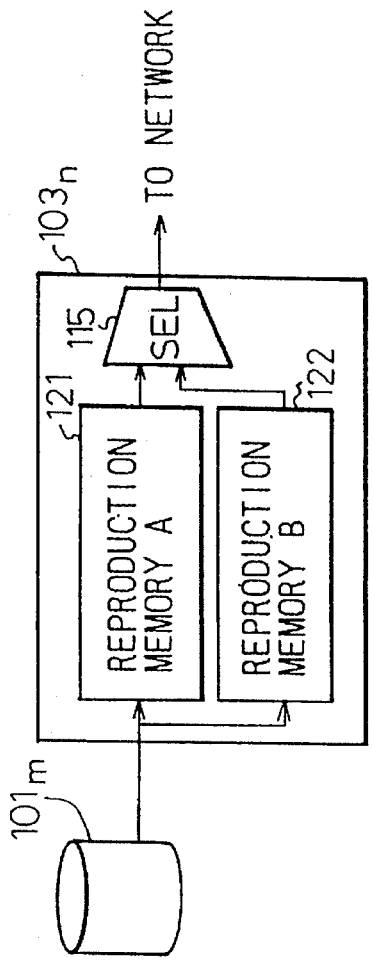
FIG. 15(A) shows a circuit for achieving a repeat function in the video information distribution system according to the present invention.
Figure 15B:
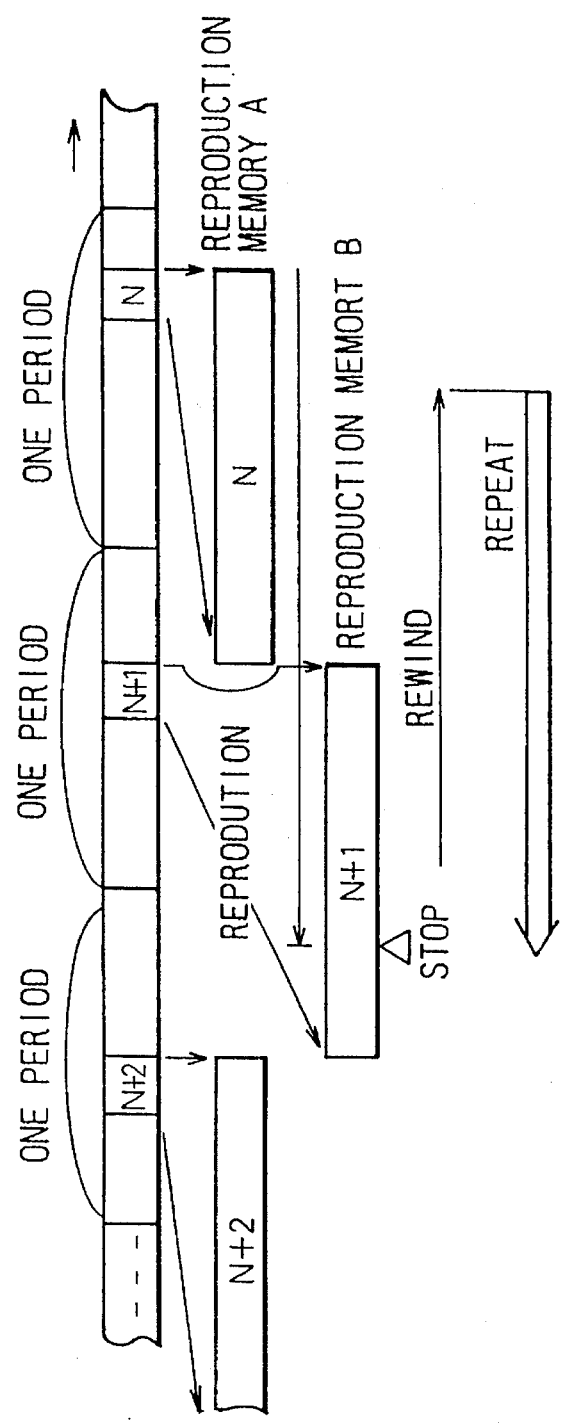
FIG. 15(B) explains an operation of the repeat function of FIG. 15(A)

FIGS. 15(A) and 15(B) explain the repeat function achieved by the video information distribution system according to the present invention.

The repeat function rewinds just reproduced video and voice data to a certain extent and again reproduces the rewound data. The present invention employs the two reproduction memories 121 and 122 that are alternately used to repeat last two minutes at the maximum and one minute at the minimum of the video and voice data. As shown in FIG. 15(B), the reproduction memories A (121) and B (122) alternately receive video data pieces (N, N+1, . . . ) each for one minute in real time from the transmission line, to hold data of two minutes in total at the maximum.

(2) Slow function

Similar to the repeat function, the just reproduced video and voice data may be rewound to a certain extent and again reproduced from the reproduction memories 121 and 122 at a lower speed and sent to the decoder. The presently reproduced data and the following data may be slowed down by decreasing the reproduction speed of the data stored in the reproduction memories.

(3) Fast-forward function

Figure 16A:
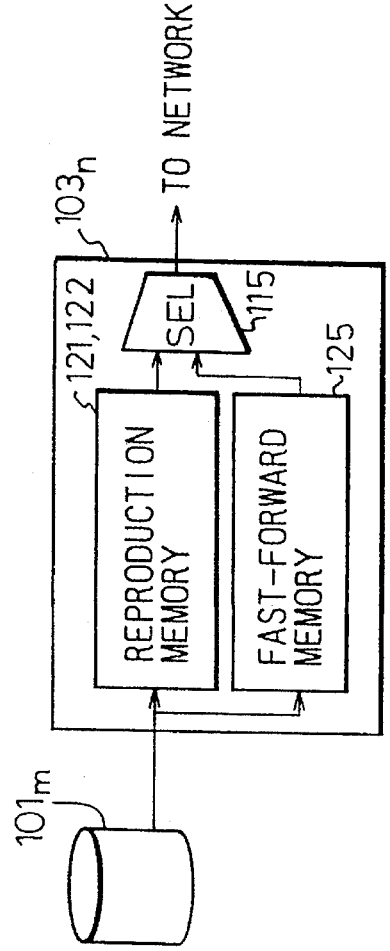
FIG. 16(A) shows a circuit for achieving a fast-forward function in the video information distribution system according to the present invention.
Figure 16B:
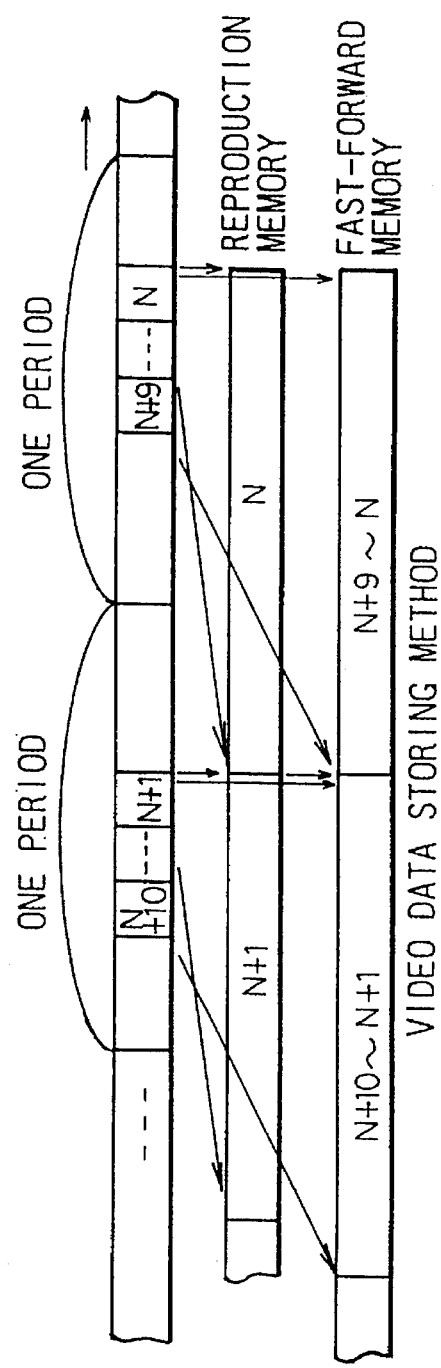
FIG. 16(B) explains an operation (1) of the fast-forward function of FIG. 16(A)

FIGS. 16(A) to 16(C) explain the fast-forward function achieved by the video information distribution system according to the present invention.

The fast-forward memory 125 is arranged at the same position as the reproduction memories 121 and 122. When data are written into the reproduction memories 121 and 122 from the transmission line, video data (N to N+9, N+1 to N+10) starting from the same point as for the reproduction memories are written into the fast-forward memory 125 at a faster sampling speed as shown in FIG. 16(B).

While the video data in the reproduction memories 121 and 122 are being reproduced, a start position in the fast-forward memory 125 is always updated as shown in FIG. 16(C). When the user issues a fast-forward request, the video data in the fast-forward memory 125 are transmitted to the user. If a fast-forward speed is 10 times faster than the normal speed, the fast-forward memory 125 stores video data at a 1/10 sampling rate corresponding to 10 minutes in real time. During the fast-forward reproduction, the next fast-forward data are fetched every minute.

(4) Fast-rewind function

Figure 17A:
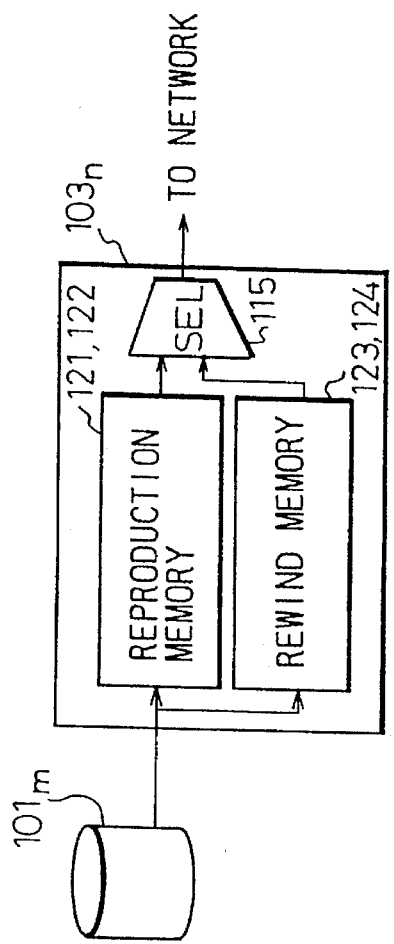
FIG. 17(A) shows a circuit for achieving a high-speed rewind function in the video information distribution system according to the present invention.
Figure 17B:
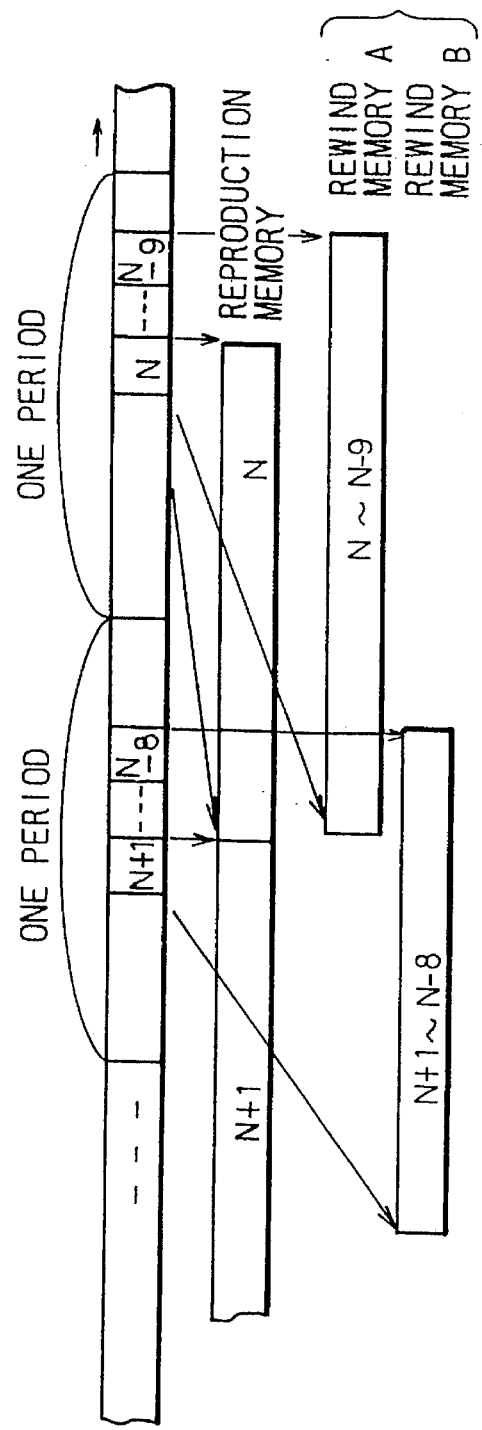
FIG. 17(B) explains an operation (1) of the high-speed rewind function of FIG. 17(A)
Figure 17C:
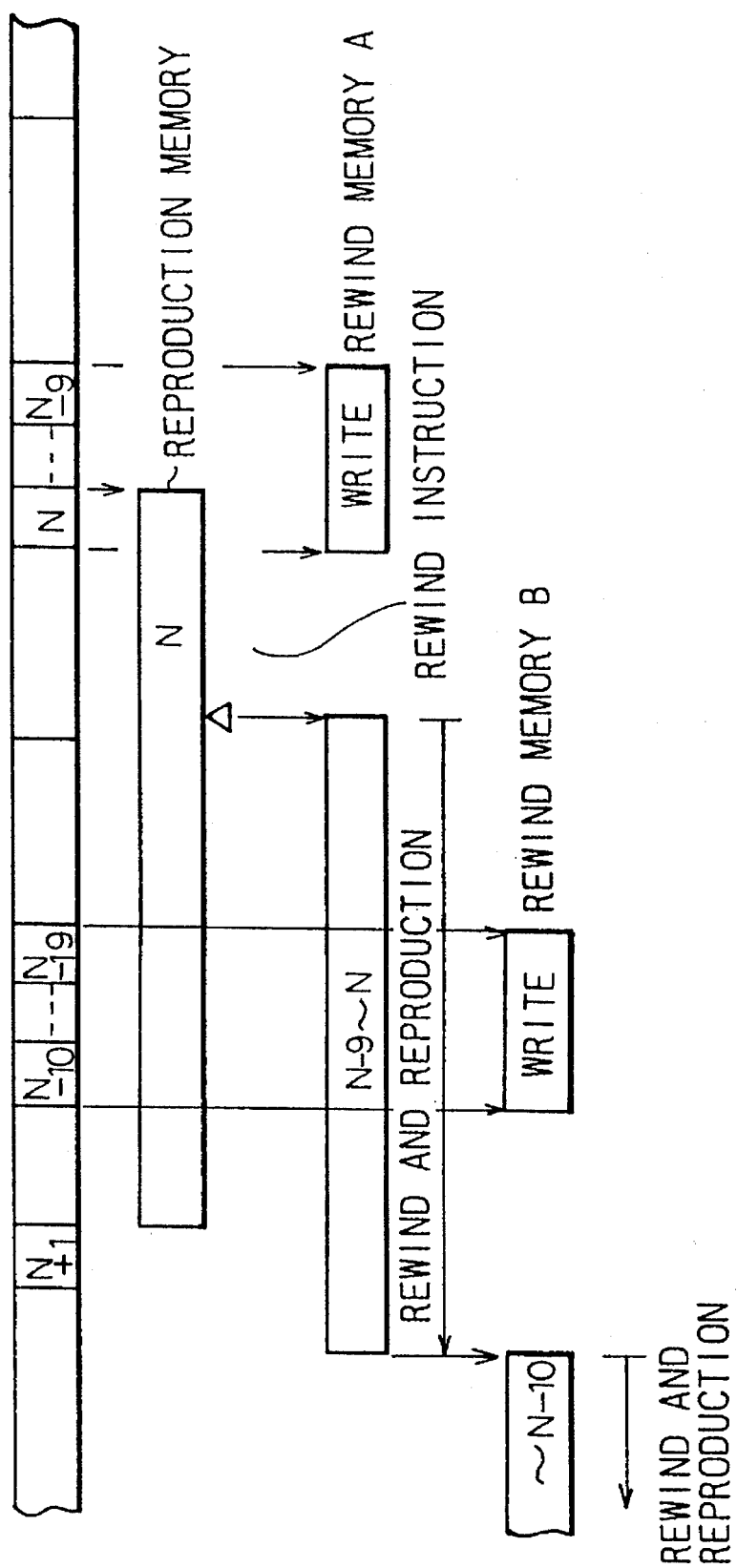
FIG. 17(C) explains an operation (2) of the high-speed rewind function of FIG. 17(A).

FIGS. 17(A) to 17(C) explain fast-rewind function achieved by the video information distribution system according to the present invention.

To realize the rewind function, vido data preceding the presently reproduced video data must be stored and reproduced at high speed in the reverse direction. Namely, the reproduction memories 121 and 122 must be read from the ends thereof at high speed.

The present invention employs the rewind memories 123 and 124 in addition to the fast-forward memory 125. As shown in FIG. 17(B), the rewind memories always receive past data (N to N−9, N+1 to N−8) preceding the present reproduction position.

As shown in FIG. 17(C), while video data are being reproduced from the reproduction memories 121 and 122, a start position in one of the rewind memories 123 and 124 is always updated. When the user issues a rewind request, video data in the rewind memory are read from the start position in the reverse direction and transmitted to the user. During the rewind operation, the next data arrive through the transmission line, so that there must be two rewind memories. According to the present invention, the second rewind memory may be used as a fast-forward memory.

As explained above, the present invention provides a near on-demand method that is a practical solution to a video on-demand service, to achieve purer bidirectionality (interactivity). Namely, the present invention (1) releases a video center from having to store a plurality of the same video program, (2) allows a plurality of users to access the same video program, and (3) provides users with nearly the same operability as that of a home video deck.

I claim:

1. A video distribution system, comprising:

a video center to be called by a user for making a request for video information;

transmission lines connected to said video center for sending said requested video information to said user, said video center in response to said request transmitting the same requested video information repeatedly through said transmission lines at high speed;

trunk units disposed in the video center or between the video center and the users, said trunk units receiving the video information repeatedly transmitted from the video center at high speed and reproducing the video information at normal speed;

a switch connecting the trunk units to the transmission lines, any one of the trunk units being allocated for a user through the switch when the user requests video information, said switch connecting the user with one of the transmission lines that transmits the video information requested by the user, each of the trunk units including:

at least one reproduction memory, means for detecting a start position in the video information transmitted at high speed, means for finding in the video information starting from the start position a portion corresponding to the capacity of the reproduction memory, means for storing the portion in the reproduction memory, and means for reproducing the video information stored in the reproduction memory at normal speed for the user.

2. The system according to claim 1, wherein the capacity of the reproduction memory is equal to or larger than a period of repetition of the video information transmitted at high speed, to consecutively receive the video information from the transmission line with no gap.

3. The system according to claim 2, wherein each of the trunk units has two reproduction memories for storing two consecutive portions of the video information from the transmission line, the two reproduction memories being alternately used so that past information stored in at least one of the reproduction memories is again reproduced if the user issues a request for repeating the just reproduced information.

4. The system according to claim 1, wherein the trunk unit reproduces the video information stored in the reproduction memory at slower speed than normal speed if the user issues a slow reproduction request.

5. The system according to claim 1, wherein the trunk unit has a fast-forward memory that samples and stores, when the reproduction memory stores the video information from the transmission line, the video information from the same start point as for the reproduction memory at a speed determined by a ratio between the normal and fast-forward speeds, the video information stored in the fast-forward memory being reproduced for the user when the user issues a fast-forward request during the normal reproduction.

6. The system according to claim 1, wherein the trunk unit has a rewind memory that finds in the video information transmitted through the transmission line a past portion preceding the present reproduction point and stores the past portion, the video information stored in the rewind memory being transmitted to the user when the user issues a rewind request during the normal reproduction.

7. The system according to claim 6, wherein the rewind memory stores the video information from the transmission line in the forward direction of memory addresses and reads the stored information from the end of the memory addresses in the reverse direction when reproducing the stored information for the user.

8. The system according to claim 6, wherein the trunk unit has two rewind memories for storing two consecutive portions of the video information transmitted through the transmission line, so that the portions of the video information stored in the rewind memories may be reproduced one after another.

9. A video distribution system, comprising:

a video center to be called by a user for making a request for video information;

transmission lines connected to said video center for sending said requested video information to said user, said video center in response to said request transmitting the same requested video information repeatedly through said transmission lines at high speed;

trunk units disposed in the video center or between the video center and the users, said trunk units receiving the video information repeatedly transmitted from the video center at high speed and reproducing the video information at normal speed;

a switch connecting the trunk units to the transmission lines, any one of the trunk units being allocated for a user through the switch when the user requests video information said switch connecting the user with one of the transmission lines that transmits the video information requested by the user, the video information being a program stored in a video file and being transmitted in a highway data format composed of frames, each frame having a program header containing a name and length of the program.

10. The system according to claim 9, wherein the program header contains data indicating the position of the frame in question in the program.

11. A video distribution system, comprising:

a video center to be called by a user for making a request for video information;

transmission lines connected to said video center for sending said requested video information to said user, said video center in response to said request transmitting the same requested video information repeatedly through said transmission lines at high speed;

trunk units disposed in the video center or between the video center and the users, said trunk units receiving the video information repeatedly transmitted from the video center at high speed and reproducing the video information at normal speed;

a switch connecting the trunk units to the transmission lines, any one of the trunk units being allocated for a user through the switch when the user requests video information, said switch connecting the user with one of the transmission lines that transmits the video information requested by the user, the video information being a program stored in a video file and being transmitted in a highway data format involving program data pieces each composed of 22 time slots of video data, one time slot of translated voice data, and one time slot of original voice data.

12. The system according to claim 11, wherein one of the translated and original voice data is selected and provided with video data to an output highway.

13. A method of distributing to a user selected video information, which is stored at a video center, comprising the steps:

(a) providing a trunk unit in circuit between said video center and a user;
(b) connecting said trunk unit to said video center by a high speed transmission line;
(c) transmitting said entire selected video information at high speed from said video center to said trunk unit via said high speed transmission line;
(d) storing at said trunk unit a first portion of said entire transmitted video information;
(e) reproducing said stored first portion in normal speed for said user;
(f) transmitting again said entire selected video information at high speed from said video center to said trunk unit via said high speed transmission;
(g) storing a second portion of said entire transmitted video information at said trunk unit, said second portion being consecutive to said first portion;
(h) reproducing said second portion in normal speed for said user; and
(i) hereafter repeatedly performing steps (f), (g) and (h) until said entire selected video information is reproduced for said user in a series of portions, the portion stored during each repeated step (f) always being the next consecutive portion following the previously stored portion.

* * * * *